Patented Aug. 17, 1954

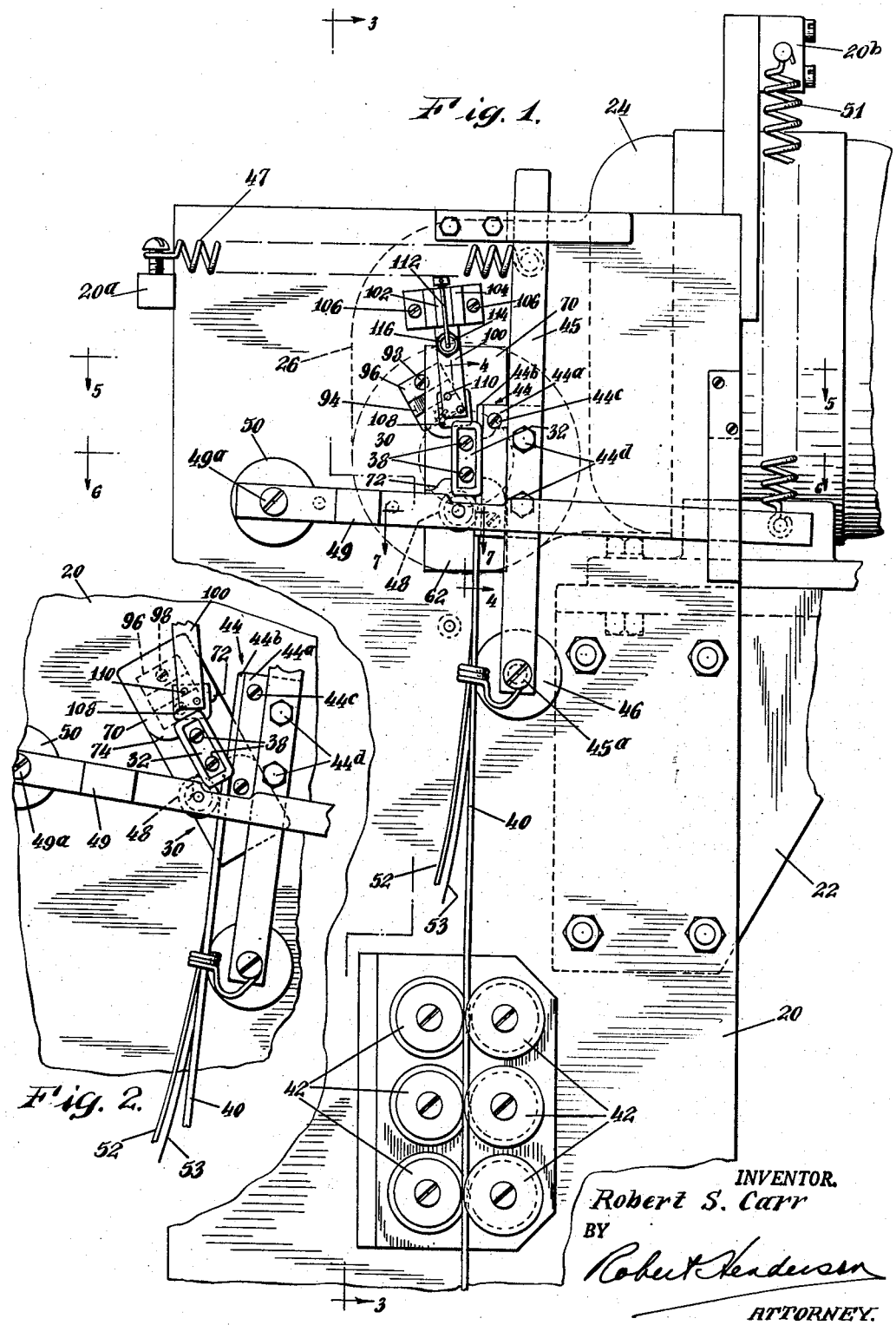

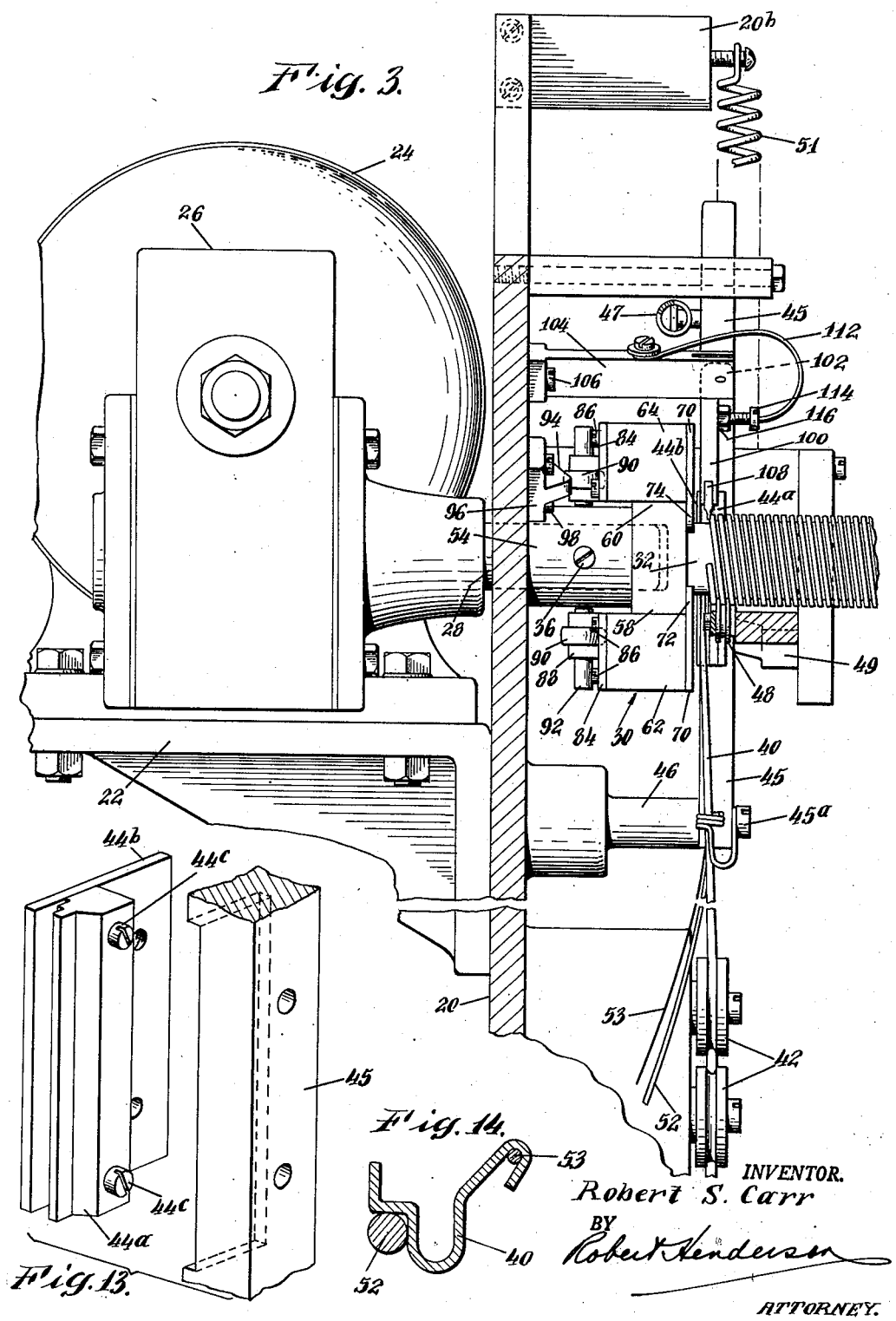

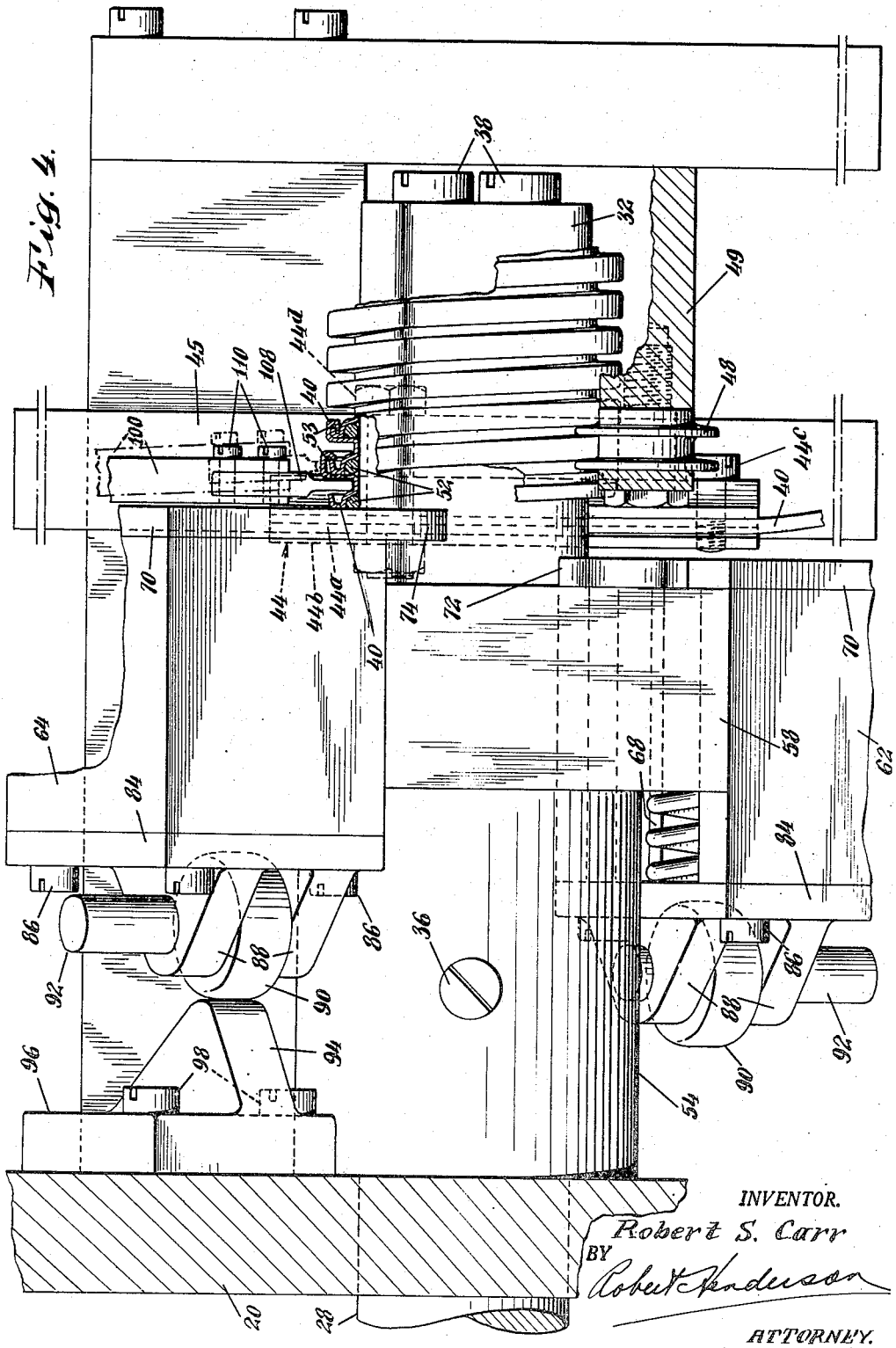

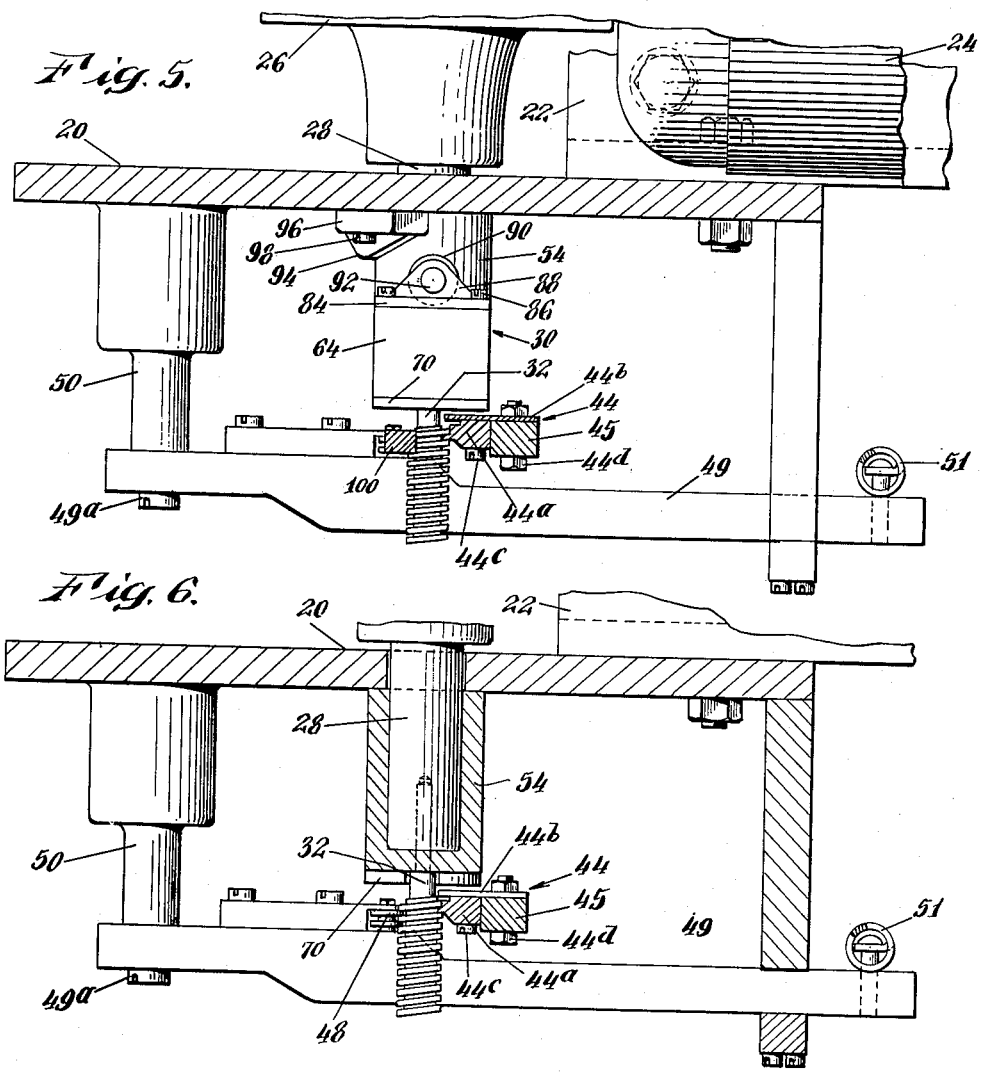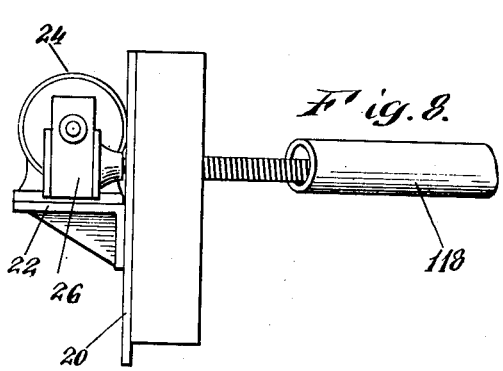

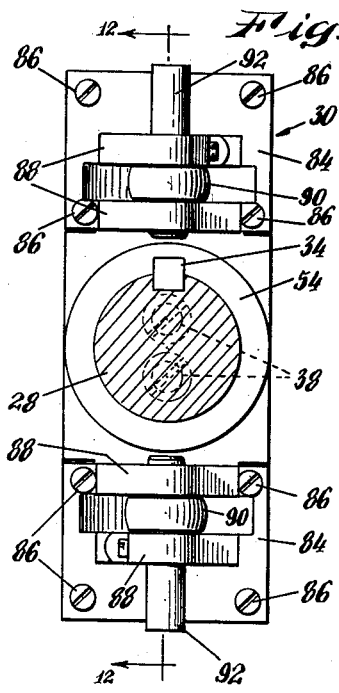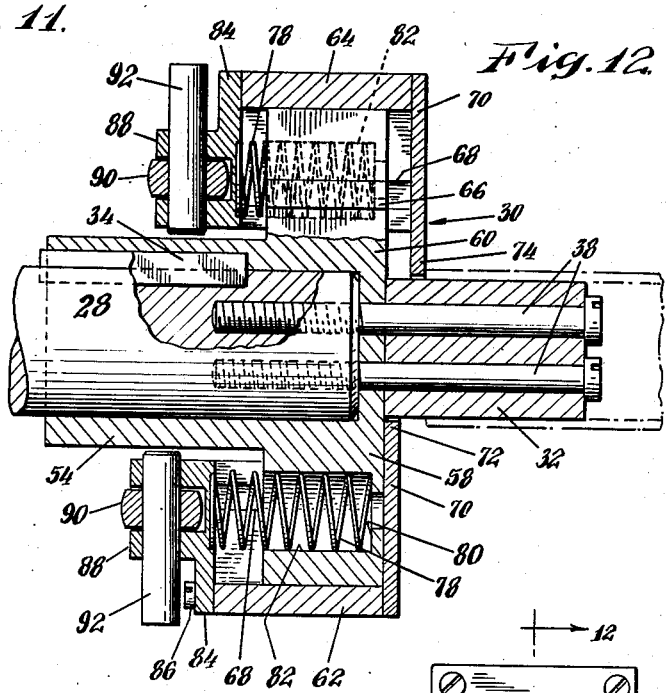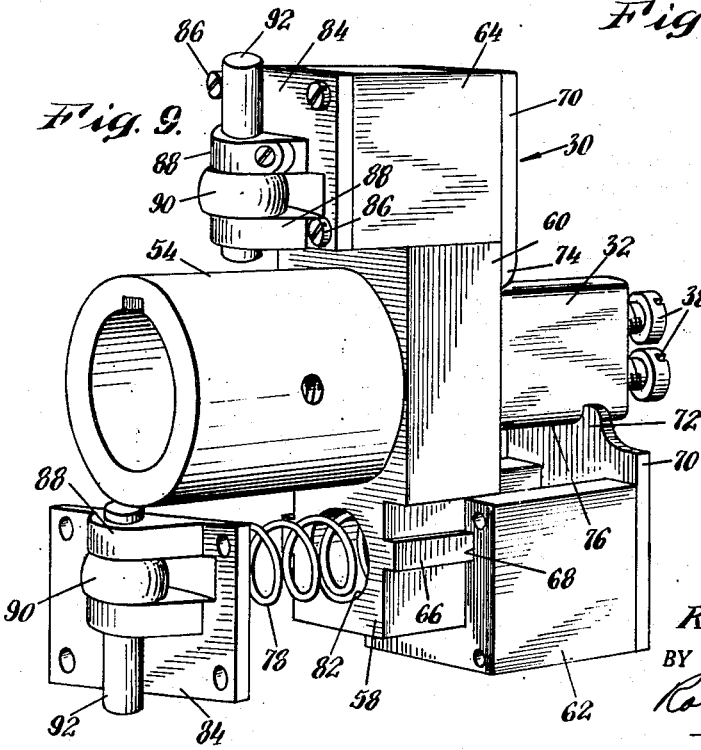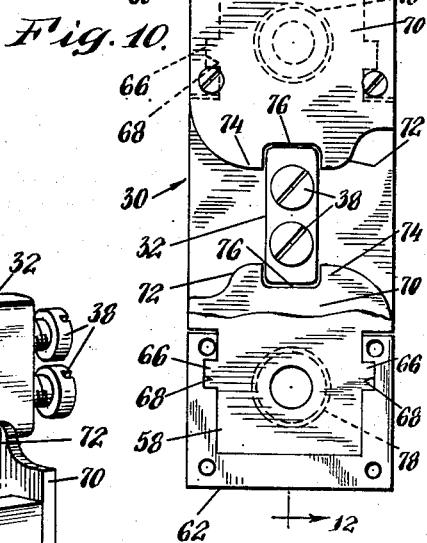

2,686,487

UNITED STATES PATENT OFFICE 2,686,487

APPARATUS FOR MAKING CONVOLUTED, FLEXIBLE, NONCIRCULAR TUBING

Robert S. Carr, Maplewood, N. J., assignor to Airtron, Inc., Linden, N. J., a corporation of New Jersey Application May 5, 1951, Serial No. 224,759

5 Claims. (Cl. 113—35)

1

The present invention relates to apparatus for making convoluted, flexible, non-circular tubing, and, more particularly, relates to apparatus which forms such tubing by winding a longitudinally grooved and flanged strip, usually of metal, upon a non-circular arbor in such manner that an edge of one turn of the strip material on the arbor interlocks with and is seamed to the opposite edge of an adjacent turn of the strip.

Although the present invention may be employed in apparatus for manufacturing tubing of various non-circular shapes in cross section, nevertheless, for illustrative purposes, and without limiting the invention thereto, it is disclosed and described in the present application as embodied in a machine for manufacturing flexible metal tubing which is rectangular in cross section and thus is particularly well suited for use as a conducting core in a flexible waveguide such as is used in radar and other electronic equipment.

It has been common practice to make such rectangular tubing by guiding a strip of longitudinally grooved and flanged strip metal onto a rotating rectangular arbor. In this relation of the strip and the arbor, the former becomes wound spirally upon the latter, with adjacent edges of successive turns in interlocking and seamed relationship. The finished tubing, thus formed, is convoluted circumferentially and thus is sufficiently flexible that it may be bent in various directions, as would occur when a waveguide utilizing such a tubing as a conducting core is bent to fit into place in electronic equipment.

One problem that arises in making flexible tubing in the manner just mentioned is that positive means are required for pushing the formed tubing forwardly upon the arbor as successive turns of the strip are applied. This forward movement, sometimes referred to as "stripping" of the tubing from the arbor, involves sliding the tubing forwardly along the arbor in opposition to the frictional engagement of the tubing therewith.

Usually, such frictional engagement is of such magnitude that considerable stripping force is required, making it desirable to provide means for preventing the tubing from collapsing endwisely as stripping occurs. More particularly, it has become the practice to feed a solid, pliant wire to the arbor simultaneously with the feeding of the strip, the wire being fed in such position that when the tubing is formed on the arbor, the wire lies between the tubing and the arbor within the inwardly facing convolutions of

2 the tubing, and, hence, supports said convolutions against endwise collapse when stripping takes place.

Where supporting wire is employed within the metal tubing, as just explained, it gives substantial, but nevertheless incomplete, support against endwise collapse of the tubing during the stripping operation. Such support is incomplete because it is effective only at the interior of the tubing, leaving the outwardly facing convolutions unsupported. The result of this is that tubing heretofore made in the manner generally described has been non-uniform with respect to the width of its outwardly facing convolutions, and, hence, has not been as satisfactory as could be desired.

Machines heretofore designed for winding longitudinally grooved strip to form flexible tubing generally provide for the strip to be directed upon a rotating arbor at a slight angle from a perpendicular to the arbor's axis of rotation, so that the strip is applied spirally. Where strip is thus applied spirally, the strip-feeding member which directs the strip onto the arbor is relied upon to push the tubing forwardly along the arbor to strip it from the latter. This push, in prior machines, is applied to the metal strip at about the moment that the latter is applied to the arbor and is directly effective at any given moment, only at a relatively small peripheral portion of the arbor so that the push is not well distributed in the tubing which is being formed.

It has also been found that when a chute is angularly disposed as recited in the next preceding paragraph, the stripping progresses somewhat non-uniformly in relation to the smaller and larger sides of the tubing being formed on a rectangular arbor so that the metal strip does not wind upon the arbor in a spiral of uniform angularity. In consequence; as the strip passing through the chute to the arbor is in unchanging angularity to the arbor's axis, it follows that if the chute is set at such an angle that the strip in the chute is of matching angularity with the previously wound last turn of strip on the arbor at the latter's larger side, it will not be of matching angularity relatively to the strip of said last turn on the arbor's smaller side, and vice versa. In order to bring the strip in the chute into sufficiently close interlocking relationship with the entire last turn of strip on the arbor, the chute must be very precisely adjusted at an angularity which is usually a compromise between the angularities of the wound strip on the larger and smaller sides of the arbor. Such a compromise adjustment is somewhat less than perfect for initiating interlocking between successive turns of strip. Apparently the front edge of the strip being fed to the arbor interacts with the rear edge of the last turn of strip thereon to bring the two said edges into proper interlocking relationship, but only if the chute is set at a very precise angularity which is difficult and time-consuming to attain.

When the strip-feeding member (sometimes hereinafter called a "chute") is relied upon also to push the tubing forwardly along the arbor, such pushing action sets up very substantial friction between the chute and the strip being directed onto the arbor. Such friction causes damage to the thin strip material unless the latter has been previously passed through a suitable, fluid lubricant; and the presence of such lubricant on the formed core is objectionable in relation to subsequent processing of the latter. In functioning for strictly strip-feeding purposes, the chute only engages the strip quite lightly so that if the chute were not required to effect the forward pushing or stripping of the formed tubing along the arbor, the friction upon the strip would be so light that lubricant would not be needed.

Accordingly, it is an important object of this invention to provide, in such tube-forming apparatus, a stripping mechanism which exerts little or no tendency to collapse the formed tubing endwisely as the stripping occurs.

Another important object of this invention is the provision, in such tube-forming apparatus, of means by which outwardly facing convolutions as well as inwardly facing convolutions of the tubing are positively supported against endwise collapse during the stripping of the tubing from the arbor.

Another important object of this invention is the provision of stripping means, in such tube-forming apparatus, which operate intermittently and apply stripping pressure only at smaller sides of the arbor where the tubing on the arbor is of greatest inherent strength because of the relative closeness of two corners of the tubing at said sides and, hence, has less of a tendency to collapse during a stripping operation.

Another important object of this invention is the provision, in such tube-forming apparatus, of a stripping mechanism which operates independently of means which guide preformed metal strip upon the arbor, thereby minimizing friction upon the strip to obviate the need for lubricating the strip, and obviating the need for a very critical and time-consuming adjustment of the chute.

Another important object of this invention is the provision, in such tube-forming apparatus, of stripping means in which the stripping push is applied to the tubing about a substantial peripheral portion of the arbor rather than only at a relatively small peripheral portion thereof.

The foregoing and other objects of the present invention are achieved in a broad sense by providing a stripping element which, or one part of which, is disposed adjacent to an arbor and which is slidable longitudinally thereof to engage a rearward end of formed tubing on the arbor to advance the tubing along the latter. The invention comprehends that the said stripping element may coact with a cam which pushes the said stripping element forwardly to cause it to engage and shift formed tubing forwardly on the arbor.

The invention further comprehends the provision of a convolution-supporting finger which is so mounted in relation to the arbor that, as the latter turns, the finger enters the rearmost convolution of the formed tubing when the smaller side of the latter is in angular register with said finger. The said finger is so mounted that it is substantially in axial alignment with the point of application of stripping force to the tubing and may advance with the tubing to the extent of each stripping push given to the tubing by the stripping mechanism; and that, upon the termination of such push, and upon the finger being cleared of the said rearmost convolution at the mentioned small side of the tubing, by the rotation of the arbor, the finger automatically retracts and resets itself into position for a further similar supporting coaction within an outwardly extending convolution formed in a subsequent turn, or part of a subsequent turn, of the strip material being wound upon the arbor.

Although the objects of this invention may be achieved by the employment of various mechanisms, nevertheless, for illustrative purposes, the invention is illustrated and described in this application as practiced in a single embodiment, without, however, limiting the invention to that particular embodiment.

In the accompanying drawings:

Figure 1 is an elevational view of one end of a machine constituting a preferred embodiment of the present invention, this end being hereinafter referred to for convenience as the "front end" of the machine.

Fig. 2 is a front end elevational view of the machine's arbor and adjacent coacting parts of the machine, the arbor being in a different angular position than in Fig. 1.

Fig. 3 is a side view of the machine, partly in vertical section, substantially on the irregular line 3—3 of Fig. 1.

Fig. 4 is a greatly enlarged side elevational view of the machine's stripping mechanism, formed tubing on the machine's arbor, an external convolution-supporting finger, and other adjacent parts; some parts appearing in vertical section and the tubing being broken away to show its structure.

Fig. 5 is a horizontal sectional view of the machine, the section being substantially on the line 5—5 of Fig. 1.

Fig. 6 is a horizontal sectional view of the machine, the section being substantially on the line 6—6 of Fig. 1.

Fig. 7 is a fragmentary, horizontal sectional, detail view showing a seaming roll and the manner in which it is mounted, the section being substantially on the line 7—7 of Fig. 1.

Fig. 8 is a more or less diagrammatic side view of the machine, illustrating the manner in which formed tubing is discharged therefrom.

Fig. 9 is a perspective, partly exploded view of a stripping mechanism employed in the machine for pushing formed tubing intermittently forwardly on the machine's arbor toward the latter's discharge end.

Fig. 10 is a front or discharge end view of the stripping mechanism illustrated in Fig. 9.

Fig. 11 is a rear end view of the stripping mechanism illustrated in Fig. 9.

Fig. 12 is a longitudinal, vertical sectional view of the mentioned stripping mechanism substantially on the line 12—12 of Figs. 10 and 11.

Fig. 13 is a perspective, partly exploded view of a guide chute for guiding preformed strip onto the machine's arbor, and a portion of a pivotal arm for supporting said chute; and Fig. 14 is an enlarged cross-sectional view through longitudinally preformed or ridged metal strip showing the manner of association therewith of a solder wire and a convolution-supporting wire as the strip is about to be spirally wound upon an arbor.

The machine shown in the drawings comprises an upright standard or supporting plate 20 suitably associated rigidly with a base (not shown) which may rest upon a floor surface. Mounted upon a bracket 22 on the back of the standard 20 is a motor 24 having a speed reducer 26 from which a shaft 28 extends forwardly through the standard.

Upon the forward end of the shaft 28 are mounted a stripping mechanism, generally identified as 30, and an arbor 32. The stripping mechanism may be constrained to rotate with the shaft by means of a key 34 (Fig. 12) in a well understood manner, and may be held against dislodgment from the shaft by a set screw 36 (Fig. 3). The arbor 32 may be held upon the end of the shaft and constrained to rotate therewith by means of machine screws 38 which, as best seen in Fig. 12, extend longitudinally through the arbor and through a portion of the stripping-mechanism structure with their inner ends threaded into the end of the shaft 28.

In a broad sense, flexible metal tubing is formed from strip metal in this machine in substantially the same manner as shown and described in my copending applications Serial No. 24,781, filed May 3, 1948, and Serial No. 160,901, filed May 9, 1950. The disclosures of said applications are therefore included herein by reference. In the present machine, somewhat similarly to my prior machines, a flat metal strip 40 is drawn upwardly from a reel (not shown) through and between a series of forming rolls 42 which form a longitudinal groove and edge flanges in said strip to give the strip a cross-sectional shape substantially as shown in Fig. 14. The strip, as thus formed, is drawn upwardly between the rotating arbor 32 and a horizontally yieldable guide chute 44.

The guide chute 44, as best seen in Fig. 13, comprises a piece 44a, which is machined to provide a longitudinal ridge and grooves on its near or inner side, giving it a shape somewhat complemental to the shape of the preformed metal strip 40 as shown in Fig. 14. The piece 44a and a flat plate 44b are held together by screws 44c.

Figs. 1 and 13 illustrate how the chute 44 is associated, by bolts 44d, with an upright pivot arm 45. The latter is pivoted at its lower end, as at 45a, upon an extension 46, which is welded to or otherwise integrally associated with the front of the standard 20. A tension spring 47 connected at its one end to a lug 20a on the standard 20 and connected at its other end to the upper end of the pivot arm 45 yieldably urges the latter and the chute 44 leftwardly, as viewed in Fig. 1, into intimate association with the metal strip 40 and the arbor 32.

As the arbor rotates counterclockwisely as viewed in Fig. 1, the chute guides the strip onto the arbor to wind it therearound in such manner (as may be understood from Fig. 4) that the edge flange on the forward side of the most rearward turn of the strip being wound upon the arbor interlocks and forms a seam with the edge flange on the rearward side of the next preceding turn of the strip on the arbor. Then, as each newly interlocked portion of the strip material passes beneath the arbor's axis, it is pressed and thus more tightly interlocked and seamed by a vertically yieldable, peripherally grooved seaming roll 48 which is carried upon a horizontal pivot arm 49. The latter is pivoted at its left end, as at 49a, upon an extension 50 which is welded to or otherwise integrally associated with the front of the standard 20. A tension spring 51 connected at its one end to a lug 20b on the standard 20 and connected at its other end to the right end of the pivot arm 49 yieldably urges the latter and the seaming roll 48 upwardly into intimate pressing association with the interlocked seam portion of the metal strip 40 to press the seam tightly closed.

A supporting wire 52 and wire solder 53 are fed to the rotating arbor, from suitable reels (not shown), simultaneously with the metal strip 40, the manner of feeding being such that when the tubing is fully formed on the arbor, the mentioned wires are located as shown in Fig. 4. The solder is made effective as such by subsequent heating of the tubing to a sufficient extent to cause the solder to melt, and then permitting the tubing to cool so that the solder sets. The supporting wire 52, being disposed within the inwardly facing convolutions of the formed tubing, prevents longitudinal collapse of said convolutions when the tubing is stripped or pushed toward the discharge or forward end of the arbor and prevents radial collapse of said convolutions from the pressing action of the seaming roll 48.

In comparable tube-forming machines of prior design, the strip is fed to the arbor helically by suitable guide means such as a chute disposed at a slight angle to a plane which is perpendicular to the axis of the tubing, and such guide means includes a backing plate or other backing member mounted in longitudinally non-shiftable relation to the axis of the arbor so that, as the strip is fed helically upon the arbor, and tubing is thus formed, the backing member functions as a reaction thrust member which continuously pushes the formed tubing forwardly on the arbor.

This forward pushing of the tubing is accompanied by sufficient frictional engagement between the arbor and the formed tubing that the latter's inwardly facing convolutions would collapse endwisely in the absence of a wire such as wire 52 or equivalent internal supporting means. Such means, provided in prior machines for supporting the inwardly facing convolutions of the tubing against longitudinal collapse, afford no support for externally facing convolutions of the tubing; and it has been found that the external convolutions tend to collapse to some extent as a result of the pushing or stripping of the tubing from the arbor.

The present invention differs substantially from prior developments such as hereinbefore described in that the strip 40, the supporting wire 52 and the wire solder 53 need not be fed helically upon the rotating arbor, but, as illustrated herein, may be fed to the arbor in a plane which is perpendicular to the arbor's axis. The present invention, therefore, includes novel means for pushing or stripping the tubing from the arbor, and also includes means for providing support of an externally facing convolution or convolutions at a time and place where such support is desirable during the stripping action.

Referring first to the stripping mechanism 30, it comprises a hub 54 constrained by the key 34 to rotate with the shaft 28, and held against endwise movement upon the latter by the set screw 36. The hub 54 is formed with similar integral arms 58, 60 which extend radially in opposite directions and are designed to fit closely and longitudinally slidably within similar pusher boxes 62, 64; a tongue-and-groove arrangement 66, 68 being provided to aid in guiding the movement of the pusher boxes and partially to secure the latter against separation from the arms 58, 60.

The pusher boxes 62, 64 and certain related parts are identical, and hence it should suffice to describe only box 62 as being provided with a tubing-pushing yoke 70 fixed to its forward end and having pushing arms 72, 74 defining opposite sides of a groove 76 within which extends the narrow side of the arbor 32. These parts are dimensioned and so arranged as to provide a clearance between the arbor and the arms 72, 74, and the bottom of the groove 76, thereby permitting relative sliding movement between the arbor 32 and said pushing arms. The mentioned clearance, however, is smaller than the thickness of the wall of the tubing to be formed on the arbor, so that the yoke 70 may function, in a manner hereinafter described, to push tubing forwardly upon the arbor.

The pusher box 62 is normally held yieldably in a rearward or retracted position by means of a coil spring 78 seated at one end against the bottom 80 of a rearwardly opening, axial, blind bore 82 in the arm 58 and seated at its other end against the inner face of a retaining plate 84 which is fixed by machine screws 86 to the rear face of the box 62. The retaining plate 84 is formed with a pair of lugs 88, between which is disposed a cam roller 90 mounted for rotation upon a pin 92 carried by said lugs.

As the complete stripping mechanism 30 rotates with the arbor, the cam rollers 90 associated with each of the pusher boxes 62, 64 alternately engage a cam surface 94 of a cam plate 96 which is fixed by machine screws 98 to the front side of the standard 20; the cam plate being so positioned as to impart a forward push to the cam roller 90 passing over said cam surface and consequently to push forwardly the related pusher box so that the pushing arm of that box will push forwardly upon the rearmost turn of the tubing being formed on the arbor immediately following the interlocking of the forward edge of the strip in that turn with the rearward edge of the next preceding turn.

As may best be understood from Figs. 1 and 2, the cam plate 96 is positioned about 30° beyond vertical with respect to the axis of rotation of the stripping mechanism 30 so that, when the latter is approximately in its angular position shown in Fig. 2, the cam surface 94 gives the then uppermost pusher box 62 or 64 a forward push. At that moment, the guide chute 44 is in contact with the tubing and the arbor only at the latter's then right lower corner and, hence, the chute is at or near to its extreme rightward position in which it does not interfere with the forward pushing movement of the then uppermost pusher box. Also, at the same moment, the only mechanical interference which may possibly oppose forward shifting of the tubing along the arbor is presented by the guide chute 44 and the seaming roll 48; but as these are effective only at the bottom corners of the tubing, the two large sides of the tubing may bend or skew very slightly in a longitudinal direction as the upper side of the tubing receives the forward push from the upper pusher box.

Inasmuch as the pusher boxes 62, 64 function alternately at each 180° of rotation to advance the tubing along the arbor, each push imparted to the tubing is relatively slight so that the mentioned skewing is relatively slight and need occur only if the chute 44 and the seaming roll 48 are so mounted that they are restrained against any material movement longitudinally of the arbor. It should be understood, however, that said chute and seaming roll may be so mounted that they may shift forwardly slightly with each forward movement of the tubing along the arbor and may shift rearwardly slightly between each such forward movement of the tubing.

Referring now to the means for preventing endwise collapse of the tubing at its outwardly facing convolutions, such means may advantageously comprise a depending finger 100 pivoted at its upper end 102 to a supporting arm 104 suitably fixed, as by screws 106, to the front face of the standard 20. A convolution-supporting tip 108 is preferably removably fixed to the lower end of the finger 100 by screws 110. This tip is in the form of a transverse plate, the lower marginal portion of which is disposed in such close proximity to the path of movement of the narrower side face of the arbor that, as the strip material overlying said face and being given its first turn upon the arbor moves into radial register with the tip 108, the latter extends within the outwardly facing convolution in said new turn of the strip material.

The tip 108 preferably is only slightly thinner than the width of said outer convolution, and the angular disposition of the cam surface 94 and of the supporting tip 108 relatively to the axis of the arbor are such that, simultaneously with the application of the pushing force of the pushing yoke 70 against the rear edge of the tubing, the supporting tip 108 lies within the said outer convolution of the new turn of strip material approximately at the point in said turn where the pushing force of the said pushing yoke 70 is applied. Thus, the tip 108 functions as a convolution filler to prevent longitudinal collapse of the rearmost outer convolution of the tubing during the period in which the latter is subjected to the stripping push.

The pivotal movement of the finger 100 preferably is limited to movement in a plane which is substantially radial to the axis of the arbor. In a normal or retracted position, the supporting tip 108 of said finger is in transverse registry with the rearmost outwardly facing convolution of the tubing on the arbor.

Because of the described pivotal mounting of the finger 100, the latter and its tip 108 shift forwardly with the stripping movement of the tubing as indicated in broken lines in Fig. 4. Inasmuch as the mentioned forward push frees the newly formed turn from any substantial binding effect on the arbor, there is little or no need thereafter for giving further support to that particular convolution.

At about the time the stripping movement is completed, the rotational movement of the arbor will have carried the narrower side of the formed tubing angularly beyond the supporting tip 108, and, as a result, the latter, being no longer engaged within any convolution of the tubing, is pushed back to its retracted position by a wire spring 112, thereby leaving said tip in position to function again in the same manner with the other narrow side of the tubing as said other narrow side moves into radial register with said supporting tip. The spring 112 exerts only a relatively light bias upon the arm 104, and the force of said spring may be rendered adjustable by providing for one end thereof to be seated within an end recess in an adjusting screw 114 threaded into the arm 104 near the latter's upper end and held in adjustment by a locking nut 116.

When tubing is being produced substantially continuously on the machine disclosed herein, the formed tubing may move from the end of the machine into a suitably supported length of pipe 118, as shown in Fig. 8, and thus be kept from bending undesirably from its own weight. The supporting wire 52 is pulled out of formed tubing after the latter has been removed from the machine, thereby leaving the tubing free to flex at its convolutions.

If desired, two or several convolution-supporting tips such as tip 108 may be fixed to the lower end of the finger 100 so that with each stripping push imparted to the tubing on the arbor, the two or several rearmost outside convolutions of the tubing will be positively supported. Experience, however, shows that a single tip 108 usually suffices.

It should be apparent from the present disclosure that this invention provides very effective stripping action, provides support for external as well as for internal convolutions of the tubing during such stripping action, and, also, achieves the several objects hereinbefore set forth.

It will also be obvious that the present inventive concepts may be utilized in other structures than those disclosed and described herein without departing from the invention as set forth in the following claims.

What I claim is:

1. Apparatus for making convoluted, flexible tubing of oblong shape in cross section, comprising a continuously rotatable arbor of oblong cross section, a chute pivotally mounted at one side of said arbor and adapted to guide longitudinally grooved, flexible strip material tangentially to said arbor for winding therearound in such manner that edge portions of adjacent turns of the strip are brought into interconnected relationship, spring means yieldably urging said chute into coaction with the arbor whereby to derive movement inwardly and outwardly of the arbor's axis during the latter's rotation, a pair of similar pushing elements slidably associated intimately with opposite sides of the arbor at a major diameter thereof and constrained to rotate with the arbor, spring means associated with each of the pushing elements normally urging the latter rearwardly, a cam element fixed in a position adjacent to the path of rotation pursued by said pushing elements with the rotation of the arbor and adapted to coact alternately with said pushing elements to urge them forwardly into pushing engagement with axially aligned portions of tubing on the arbor, and a convolution-supporting pivotal finger disposed adjacent to the arbor, fixed against bodily rotation about the arbor's axis and capable of pivoting only in a plane extending longitudinally of the arbor, the inner end of said finger being so spaced from the arbor's axis that it is in position to engage within exterior convolutions of tubing on the arbor only at a major diameter of the latter, the said finger being adapted by its pivotal mounting to move forwardly with each push imparted to the tubing and having a spring associated therewith urging said finger rearwardly, upon the latter becoming disengaged from one of said exterior convolutions during the rotation of the arbor, to a rearward position adapting it to later engage a more rearward convolution of the tubing on the arbor.

2. Apparatus for making flexible tubing of oblong shape in cross-section, comprising a continuously rotatable arbor of oblong cross-sectional shape, means at one side of said arbor's axis of rotation for guiding flexible strip material tangentially onto the arbor and pressing it thereon in a tight spiral in which edge portions of successive turns of such strip material interengage to convert the strip material into a tube, and means coacting with such a tube at the opposite side of said axis for alternately pushing laterally opposite portions of such a tube forwardly on said arbor; said pushing means comprising a tube-pushing member slidably mounted at one side of said arbor, rearwardly of such a tube, for sliding longitudinally of the arbor and constrained to rotate with the latter, and cam means coacting with said pushing member to slide the latter forwardly into pushing engagement with a side portion, of the rear end of such a tube, which is opposite to the tube's side on which, at the same time, the strip material is being guided and pressed onto the arbor.

3. Apparatus according to claim 2, wherein said tube-pushing means comprise a pair of said tube-pushing members disposed at opposite sides of said arbor in the longitudinal plane of the latter's major diameter and operable independently of each other; said cam means coacting alternately with the two pushing members to cause said pushing engagement of the pushing means alternately with opposite sides of the rear end of such a tube.

4. Apparatus according to claim 2, further including spring means yieldably urging said tube-pushing member rearwardly and said cam means being adapted positively to urge said tube-pushing member forwardly.

5. Apparatus according to claim 2, for making tubing having circumferential convolutions, further including a convolution-supporting pivotal finger disposed adjacent to the arbor at the side of the latter's axis of rotation at which the mentioned pushing engagement occurs, the said finger being fixed against bodily rotation about said axis and capable of pivoting only in a plane extending longitudinally of the arbor, the inner end of said finger being so spaced from the said axis that it is in position to engage within exterior convolutions of the tube on the arbor only at a major diameter of the latter, the said finger being adapted by its pivotal mounting to move forwardly with each push imparted to the tube by said pushing member and having means associated therewith for urging said finger rearwardly, upon the latter becoming disengaged from one of said exterior convolutions during rotation of the arbor, to a rearward position adapting it to later engage a more rearward convolution of the tube on the arbor.

References Cited in the file of this patent

UNITED STATES PATENTS

| Number | Name | Date |
|---|---|---|
| 1,122,447 | Wagner | Dec. 29, 1914 |
| 2,100,046 | Blount | Nov. 23, 1937 |
| 2,179,881 | Du Boscq | Nov. 14, 1939 |
| 2,440,792 | Wyllie | May 4, 1948 |